United States Patent
Ferreira-Providakis et al.

(10) Patent No.: US 9,624,830 B2
(45) Date of Patent: Apr. 18, 2017

(54) GAS TURBINE WITH IMPROVED PART LOAD EMISSIONS BEHAVIOR

(71) Applicant: ALSTOM Technology Ltd, Baden (CH)

(72) Inventors: Theodoros Ferreira-Providakis, Wettingen (CH); Ghislain Singla, Bern (CH); Thiemo Meeuwissen, Ennetbaden (CH); Sebastian Lipari, Neuenhof (CH); Ourania-Nektaria Margari, Zürich (CH)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 346 days.

(21) Appl. No.: 14/336,174

(22) Filed: Jul. 21, 2014

(65) Prior Publication Data

US 2015/0040573 A1    Feb. 12, 2015

(30) Foreign Application Priority Data

Aug. 8, 2013  (EP) .................................... 13179746

(51) Int. Cl.
*F02C 6/00*        (2006.01)
*F01N 3/18*        (2006.01)
(Continued)

(52) U.S. Cl.
CPC ................ *F02C 6/003* (2013.01); *F01N 3/18* (2013.01); *F02C 7/22* (2013.01); *F02C 7/228* (2013.01); *F02C 9/20* (2013.01); *F02C 9/28* (2013.01); *F23N 1/022* (2013.01); *F23N 5/022* (2013.01); *F23R 3/346* (2013.01); *F05D 2270/08* (2013.01); *F05D 2270/112* (2013.01);
(Continued)

(58) Field of Classification Search
CPC .... F02C 7/22; F02C 9/26; F02C 6/003; F02C 7/228; F01N 3/18; F23R 3/346
USPC ........................................ 60/772, 39.17, 776
See application file for complete search history.

(56) References Cited

U.S. PATENT DOCUMENTS 5,634,327 A    6/1997  Kamber et al.
7,293,415 B2   11/2007 Hoffmann et al.
(Continued)

FOREIGN PATENT DOCUMENTS

CH     700 796 A1    10/2010
CN     1771385 A      5/2006
(Continued)

OTHER PUBLICATIONS

Office Action issued on Sep. 16, 2015, by the State Intellectual Property Office of People's Republic China in corresponding Chinese Patent Application No. 201410387783.3, and an English translation of the Office Action. (15 pgs).
(Continued)

*Primary Examiner* — Steven A. Reynolds
(74) *Attorney, Agent, or Firm* — Buchanan Ingersoll & Rooney PC

(57) ABSTRACT

In a method for the low-CO emissions part load operation of a gas turbine with sequential combustion, the opening of the row of variable compressor inlet guide vanes is controlled depending on the temperatures of the operative burners of the second combustor and simultaneously the number of operative burners is kept at a minimum. This leads to low CO emissions at partial load of the gas turbine.

20 Claims, 7 Drawing Sheets

(51) Int. Cl.
  *F02C 7/22* (2006.01)
  *F02C 7/228* (2006.01)
  *F02C 9/20* (2006.01)
  *F02C 9/28* (2006.01)
  *F23R 3/34* (2006.01)
  *F23N 1/02* (2006.01)
  *F23N 5/02* (2006.01)

(52) U.S. Cl.
  CPC .... *F05D 2270/303* (2013.01); *F23N 2025/08* (2013.01); *F23N 2037/02* (2013.01); *F23N 2041/20* (2013.01); *F23R 2900/03341* (2013.01)

(56) References Cited

U.S. PATENT DOCUMENTS

| | | | |
|---|---|---|---|
| 8,434,312 B2 | 5/2013 | Eroglu et al. | |
| 8,516,829 B2 | 8/2013 | Ewens et al. | |
| 8,794,008 B2 | 8/2014 | Eroglu et al. | |
| 8,826,670 B2 | 9/2014 | Hoffmann et al. | |
| 8,843,293 B2 | 9/2014 | Rofka et al. | |
| 2004/0216462 A1 | 11/2004 | Hellat et al. | |
| 2005/0109033 A1* | 5/2005 | Braun | F02C 7/141 60/772 |
| 2006/0010876 A1 | 1/2006 | Hoffmann et al. | |
| 2009/0126367 A1* | 5/2009 | Chhabra | F02C 7/228 60/734 |
| 2009/0150040 A1 | 6/2009 | Rofka et al. | |
| 2010/0300062 A1 | 12/2010 | Ewens et al. | |
| 2011/0037276 A1 | 2/2011 | Hoffmann et al. | |
| 2011/0289898 A1 | 12/2011 | Hellat et al. | |
| 2011/0289899 A1 | 12/2011 | De La Cruz Garcia et al. | |
| 2012/0017601 A1 | 1/2012 | Eroglu et al. | |
| 2013/0042621 A1* | 2/2013 | Carroni | F02C 7/224 60/736 |
| 2013/0125557 A1 | 5/2013 | Scipio et al. | |
| 2013/0219904 A1 | 8/2013 | Eroglu et al. | |

FOREIGN PATENT DOCUMENTS

| | | |
|---|---|---|
| CN | 101900033 A | 12/2010 |
| CN | 103133147 A | 6/2013 |
| EP | 0 718 470 A2 | 6/1996 |
| EP | 2 600 063 A2 | 6/2013 |
| JP | S63-097835 A | 4/1988 |
| JP | H08-218898 A | 8/1996 |
| JP | H10-306924 A | 11/1998 |
| JP | 2006-517636 A | 7/2006 |
| JP | 2007-232235 A | 9/2007 |
| JP | 2009-138750 A | 6/2009 |
| JP | 2011-513635 A | 4/2011 |
| JP | 2011-247265 A | 12/2011 |
| JP | 2012-522922 A | 9/2012 |

OTHER PUBLICATIONS

Search Report issued on Sep. 2, 2015, by the State Intellectual Property Office of People's Republic China in corresponding Chinese Patent Application No. 201410387783.3 in English. (2 pgs).
Office Action (Notification of Reasons for Refusal) issued on Aug. 3, 2015, by the Japanese Patent Office in corresponding Japanese Patent Application No. 2014-160291, and an English Translation of the Office Action. (6 pages).

* cited by examiner

GAS TURBINE WITH IMPROVED PART LOAD EMISSIONS BEHAVIOR

CROSS-REFERENCE TO RELATED APPLICATIONS

This application claims priority to European application 13179746.6 filed Aug. 8, 2013, the contents of which are hereby incorporated in its entirety.

TECHNICAL FIELD

The disclosure relates to a method for operating a gas turbine with sequential combustion and low CO emissions.

BACKGROUND

Gas turbines with sequential combustion have been successful in commercial operation for some time now. In them, compressed air is combusted with fuel in a first combustor and a first turbine, referred to as the high-pressure turbine, is exposed to admission of hot gases. The temperature of the hot gases which discharge from the high-pressure turbine is increased again in a second combustor as a result of renewed addition of fuel and its combustion, and a second turbine, which is referred to as the low-pressure turbine, is exposed to admission of these hot gases.

Compared with conventional gas turbines with only one combustor, they are characterized by the additional degree of freedom of a separate fuel control for the first and second combustors. This furthermore offers the possibility of first of all putting into operation only the first combustor and engaging the second combustor only in the case of higher load. This enables a flexible operating concept with good emissions behavior over a wide operating range of the gas turbine.

In recent years, the main focuses of development were the reduction of NOx emissions and higher part load efficiency.

Gas turbines with sequential combustion, which are operated according to known methods, as are described in EP 0718470, for example, have very low NOx emissions and can achieve excellent part load efficiency.

The aforementioned known operating concepts, however, at low part load, especially within the range of about 20% to 50% of the relative load, can lead to high CO (carbon monoxide) emissions.

These high CO emissions are typically created at low part load by the second combustor of a gas turbine with sequential combustion. Conventionally, the second combustor is ignited at low part load if the rows of variable compressor inlet guide vanes are closed and the hot gas temperature or turbine inlet temperature of the high-pressure turbine has reached an upper limit value. For ignition, the second combustor is supplied with a minimum fuel flow which is typically prespecified by the control characteristic of the fuel control valve. On account of the high exhaust temperature of the first turbine, self-ignition of the fuel flow which is introduced into the second combustor occurs. The fuel flow is increased via the load for load control. Providing the fuel flow is low, the temperature of the hot gases in the second combustor is not significantly increased. The reaction speed remains correspondingly relatively low and unburned hydrocarbons and CO may occur on account of the short residence time in the combustor. These occur especially in the case of lean combustion that is to say in the case of combustion with a high air ratio $\lambda$. The air ratio $\lambda$ is the ratio of air mass actually available for combustion to the at least required stoichiometric air mass. It is also referred to as air coefficient, air ratio number, or excess air.

Within the limits of a flexible power plant operation, however, the possibility of running for longer operating periods at low part load is increasingly also required. A longer operation at low part load can only be realized if the CO emissions also remain at a low level.

One successful method to keep the CO emissions at partial load low is known from CH 700796 A and the parallel U.S. Pat. No. 8,434,312 B2 of the applicant. This method controls the air fuel ratio of the operative burners of the second combustor to keep the CO emissions low.

SUMMARY

It is an object of the present disclosure to provide a further method for operating a gas turbine with sequential combustion and a gas turbine with sequential combustion which enables operation with reduced CO emissions at partial load. Further this method should be safe and easy to execute.

This objective is achieved by the claimed method based on a gas turbine with sequential combustion, wherein the gas turbine includes a first turbine, a second turbine, at least one compressor, wherein the at least one compressor includes a row of variable compressor inlet guide vanes, a first combustor which is connected downstream to the compressor and the hot gases of which first combustor are admitted to the first turbine, and a second combustor which is connected downstream to the first turbine and the hot gases of which are admitted to the second turbine, the second combustor including operative burners each having a burner exhaust temperature, wherein the claimed method comprises the following steps: Controlling the position of the variable compressor inlet guide vanes depending on the burner exhaust temperature of at least one of the operative burners and in case of increasing loads switching "ON" a further burner of the second combustor in case the average of the turbine exhaust temperature of the second turbine reaches a lower limit value and in case of decreasing loads switching "OFF" one of the operative burners of the second combustor in case the average of the turbine exhaust temperature of the second turbine reaches a lower limit value.

By controlling the position of the variable compressor inlet guide vanes depending on the burner exhaust temperature of at least one of the operative burners of the second combustor it can be guaranteed that none of the operative burners of the second combustor or another component of the turbine is exposed to temperatures that are above a maximum admissible temperature TAT2 max control. If the exhaust temperatures of each operative burner of the second combustors do not exceed the temperature limit TAT2 max control, it can be guaranteed that neither the burners nor other parts of the second turbine of the gas turbine are exposed to excess temperatures. Consequently damages and reduction of the component life time can be avoided.

Further, by switching "ON" a further burner of the second combustor in case the average of the turbine exhaust temperature of the second turbine reaches a lower limit value makes sure that the exhaust temperature of the second turbine complies with process parameters of a subsequent steam cycle or another waste heat driven process. As a result, the steam cycle or the subsequent waste heat process can be operated with good efficiency.

The same applies in case of decreasing loads, if one of the operative burners of the second combustors is switched "OFF" in case the average of the turbine exhaust temperature of the second turbine reaches the aforementioned lower limit value.

Briefly said: The claimed method guarantees that the lifetime of the components of the gas turbine is not reduced due to excess temperatures and, on the other hand, the process parameters of subsequent processes (steam cycle or waste heat) are reached. Further, the CO-emissions are low, since the number of burners is minimized and therefore, the exhaust temperatures of the operative burners are rather high which leads to reduced CO2-emissions. To implement this method in a gas turbine control scheme is rather easy, since the required input data are available or easy to obtain by installing some further temperature sensors.

It is further claimed that the position of the variable compressor inlet guide vanes is controlled from the maximum turbine exhaust temperature of the operative burners.

This feature makes sure that independent from the number of operative burners and their location inside of the second combustor, none of these burners is exposed to high temperatures that may cause damage or a life time reduction of this particular burner.

To achieve a simple and easy to execute control concept, it is further claimed that a position of the variable compressor inlet guide vanes is controlled depending on the difference between the highest burner exhaust temperature of the operative burners and the maximum turbine exhaust temperature. It is therefore possible to open the variable compressor inlet guide vanes if the burner exhaust temperature of one of the operative burners reaches or exceeds the maximum turbine exhaust temperature.

In a further embodiment of the claimed invention, it is claimed that the variable compressor inlet guide vanes are closed slightly, if the highest burner exhaust temperature of the operative burners is below the maximum turbine exhaust temperature TAT2 max control.

This is the reverse process to opening the variable compressor inlet guide vanes and leads maximum burner exhaust temperatures and consequently, to a minimum of CO-emissions.

In case all burners of the second combustor are in operation, the position of the variable compressor inlet vanes is controlled depending on the average temperature of the turbine exhaust temperature.

In this load range (all burners of the second turbine active) it is further claimed that the position of the variable compressor inlet guide vanes is controlled so that the average temperature of the turbine exhaust temperature is equal to an upper limit of the average turbine exhaust temperature. Doing so, the exhaust temperature is raised to a temperature higher than the lower limit value and therefore, the subsequent processes (steam cycle or waste heat process) may be operated with increased output, too.

Further, it is claimed that in case the load increases the rate of fuel supply to the second combustor and/or the first combustor is increased. Consequently, the rate of fuel supplied to the second combustor and/or the first combustor is reduced with a load decrease.

Further advantages and developments are to be gathered from the description and the attached drawings. All the explained advantages are applicable not only in the respectively specified combinations, but also in other combinations or alone without departing from the scope of the disclosure.

DETAILED DESCRIPTION

Figure 1:
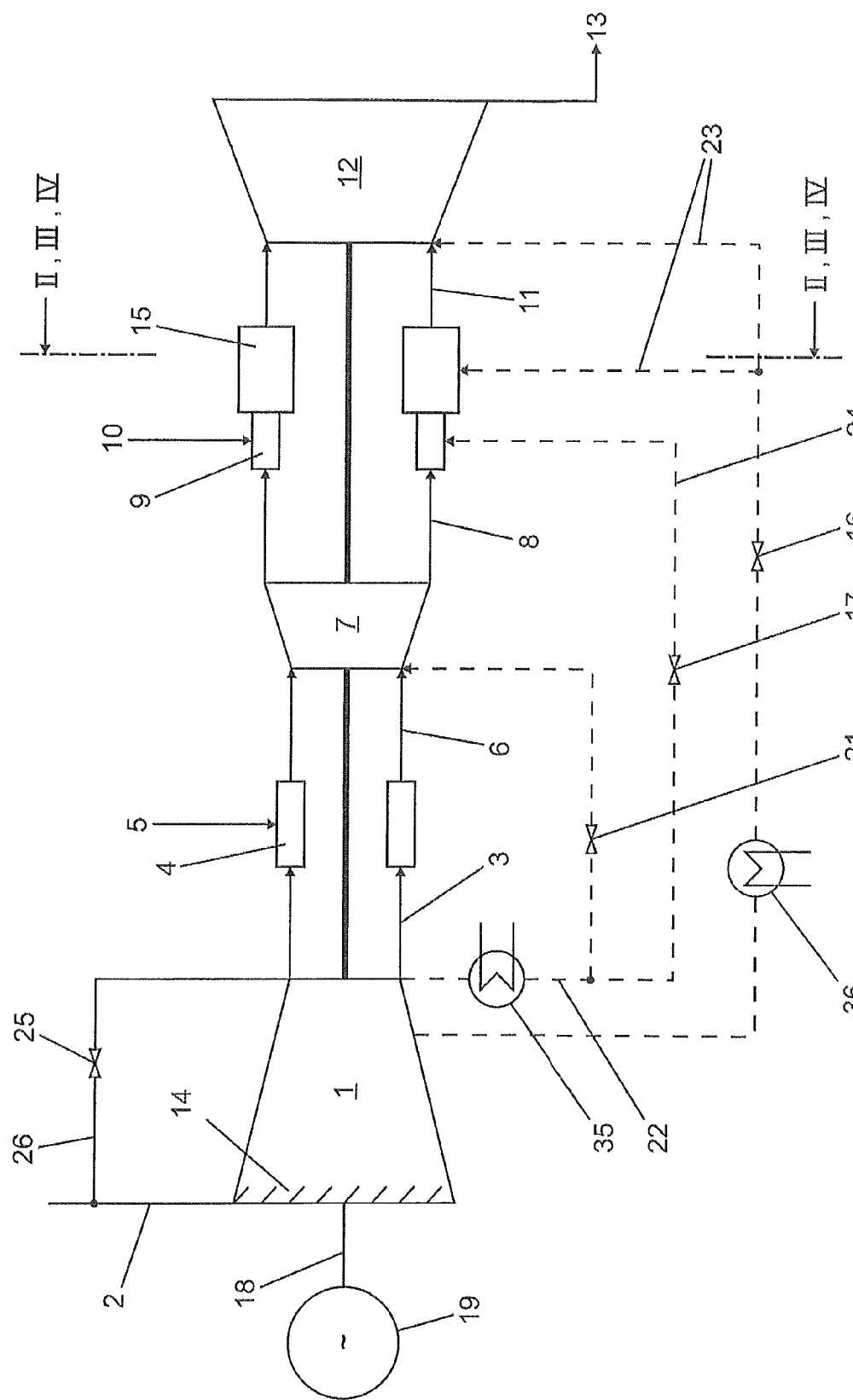
FIG. 1 shows a gas turbine with sequential combustion.

FIG. 1 shows a gas turbine with sequential combustion useful for implementing methods as described herein. The gas turbine includes a compressor 1, a first combustor 4, a first turbine 7, a second combustor 15, and a second turbine 12. Typically, it includes a generator 19 which, at the cold end of the gas turbine, that is to say at the compressor 1, is coupled to a shaft 18 of the gas turbine.

A fuel, gas or oil, is introduced via a fuel feed 5 into the first combustor 4, mixed with air which is compressed in the compressor 1, and combusted. The hot gases 6 are partially expanded in the subsequent first turbine 7, performing work.

As soon as the second combustor is in operation due to an increase of load, additional fuel, via a fuel feed 10, is added to the partially expanded gases 8 in burners 9 of the second combustor 15 and combusted in the second combustor 15. The hot gases 11 are expanded in the subsequent second turbine 12, performing work. The exhaust gases 13 can be beneficially fed to a waste heat boiler of a combined cycle power plant or to another waste heat application.

For controlling the intake mass flow, the compressor 1 has at least one row of variable compressor inlet guide vanes 14.

In order to be able to increase the temperature of the intake air 2, provision is made for an anti-icing line 26 through which some of the compressed air 3 can be added to the intake air 2. For control, provision is made for an anti-icing control valve 25. This is usually engaged on cold days with high relative air moisture in the ambient air in order to forestall a risk of icing of the compressor.

Some of the compressed air 3 is tapped off as high-pressure cooling air 22, recooled via a high-pressure cooling air cooler 35 and fed as cooling air 22 to the first combustor 4 (cooling air line is not shown) and to the first turbine.

The mass flow of the high-pressure cooling air 22, which is fed to the high-pressure turbine 7, can be controlled by a high-pressure cooling air control valve 21 in the example.

Some of the high-pressure cooling air 22 is fed as so-called carrier air 24 to the burner lances of the burners 9 of the second combustor 15. The mass flow of carrier air 24 can be controlled by a carrier-air control valve 17.

Some of the air is tapped off, partially compressed, from the compressor 1, recooled via a low-pressure cooling air cooler 36 and fed as cooling air 23 to the second combustor 15 and to the second turbine 12. The mass flow of cooling air 23 can be controlled by a cooling-air control valve 16 in the example.

Figure 2:
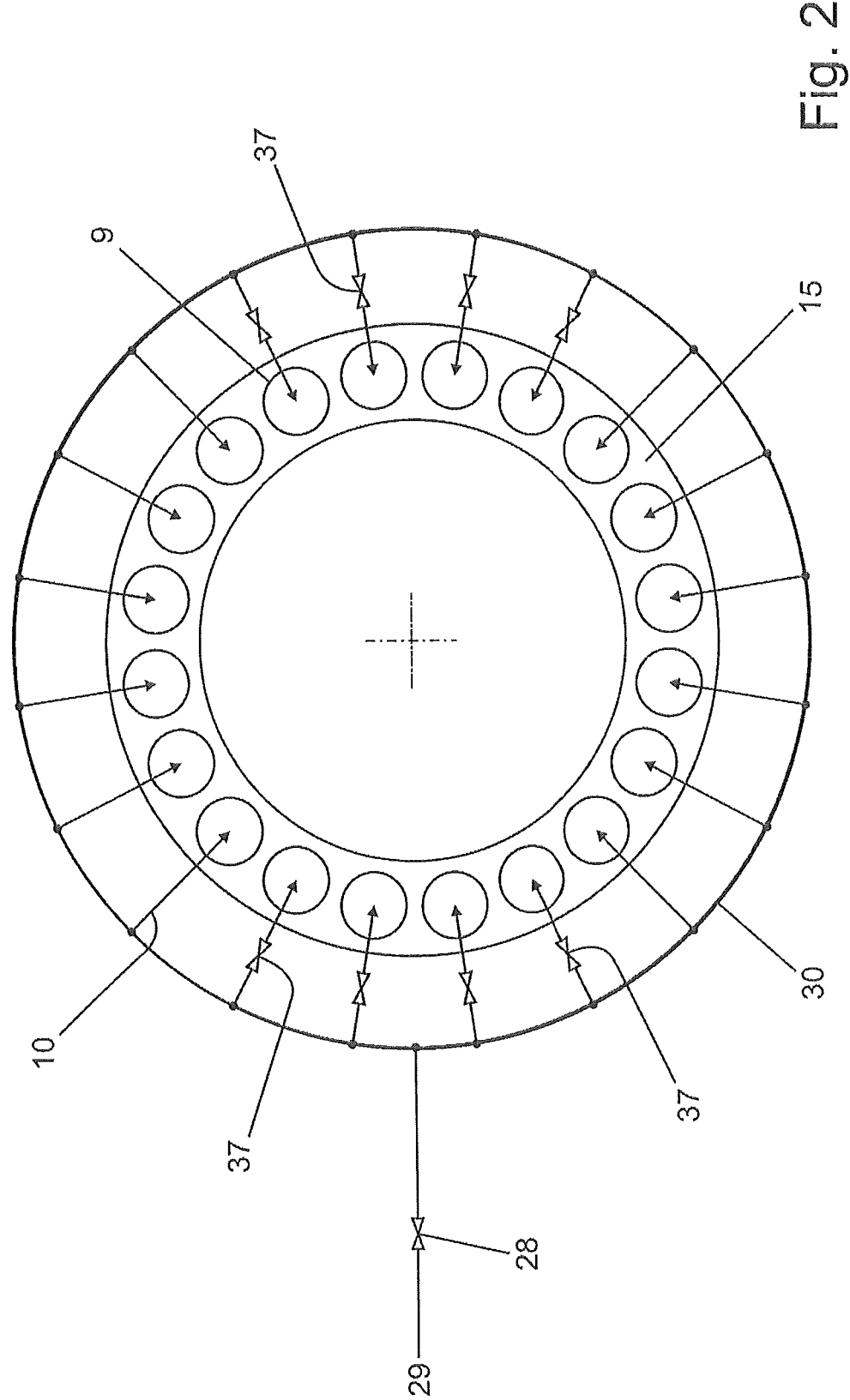
FIG. 2 shows a section through the second combustor of a gas turbine with sequential combustion and also the fuel distribution system with a fuel ring main and eight individual on/off valves for the restricting of eight burners.
Figure 3:
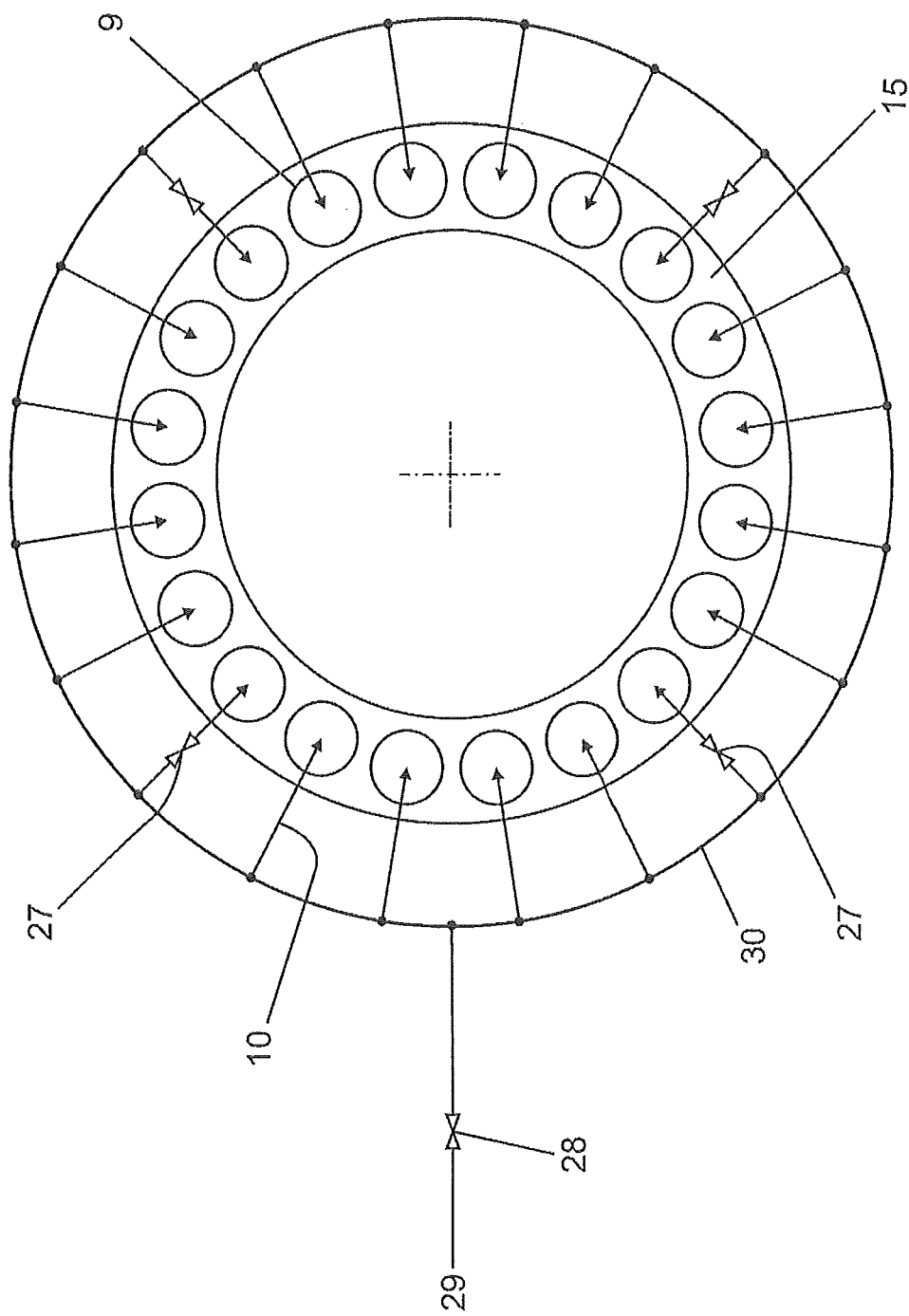
FIG. 3 shows a section through the second combustor of a gas turbine with sequential combustion and also the fuel distribution system with a fuel ring main and four individual control valves for controlling the fuel flow of four burners.

The combustors 4 and 15 are constructed as annular combustors, for example, with a large number of individual burners 9, as is shown in FIGS. 2 and 3 by way of example of the second combustor 15. Each of these burners 9 is supplied with fuel via a fuel distribution system and a fuel feed 10.

FIG. 2 shows a section through the second combustor 15 with burners 9 of a gas turbine with sequential combustion, and also the fuel distribution system with a fuel ring main 30 and eight individual on/off valves 37 for deactivating eight burners 9. By closing individual on/off valves 37, the fuel feed to individual burners 9 is stopped and this is distributed to the remaining burners, wherein the overall fuel mass flow is controlled via a control valve 28. As a result, the air ratio λ of the burners 9 in operation is reduced.

Apparently each of the operative burners 9 produces hot exhaust gases. The temperature of these hot exhaust gases are referred to as burner exhaust gases BET and may be differ between the operative burners 9.

FIG. 3 shows a section through the second combustor 15 and also a fuel distribution system with a fuel ring main 30 and fuel feeds 10 to the individual burners 9. In the example, four burners 9 are provided with individual control valves 27 for controlling the fuel flow in the fuel feeds 10 to the respective burners 9. The overall fuel mass flow is controlled via a control valve 28. The separate controlling of the fuel mass flow to the four burners 9 with individual control valves 27 allows staging. The four individual control valves are fully opened at low part load so that fuel is introduced evenly into all the burners 9 of the second combustor 15, so that all the burners 9 are operated with the same air ratio λ for minimizing the CO emissions. With increasing relative load, particularly if, for example, above 70% relative load increased pulsations can occur, the individual control valves 27 are slightly closed in order to realize a staging and therefore to stabilize the combustion. In this case, the air ratio λ of the burner 9 which is supplied via the slightly closed individual control valves 27 is increased. This, however, at high load is non-critical with regard to the CO emissions.

Figure 4:
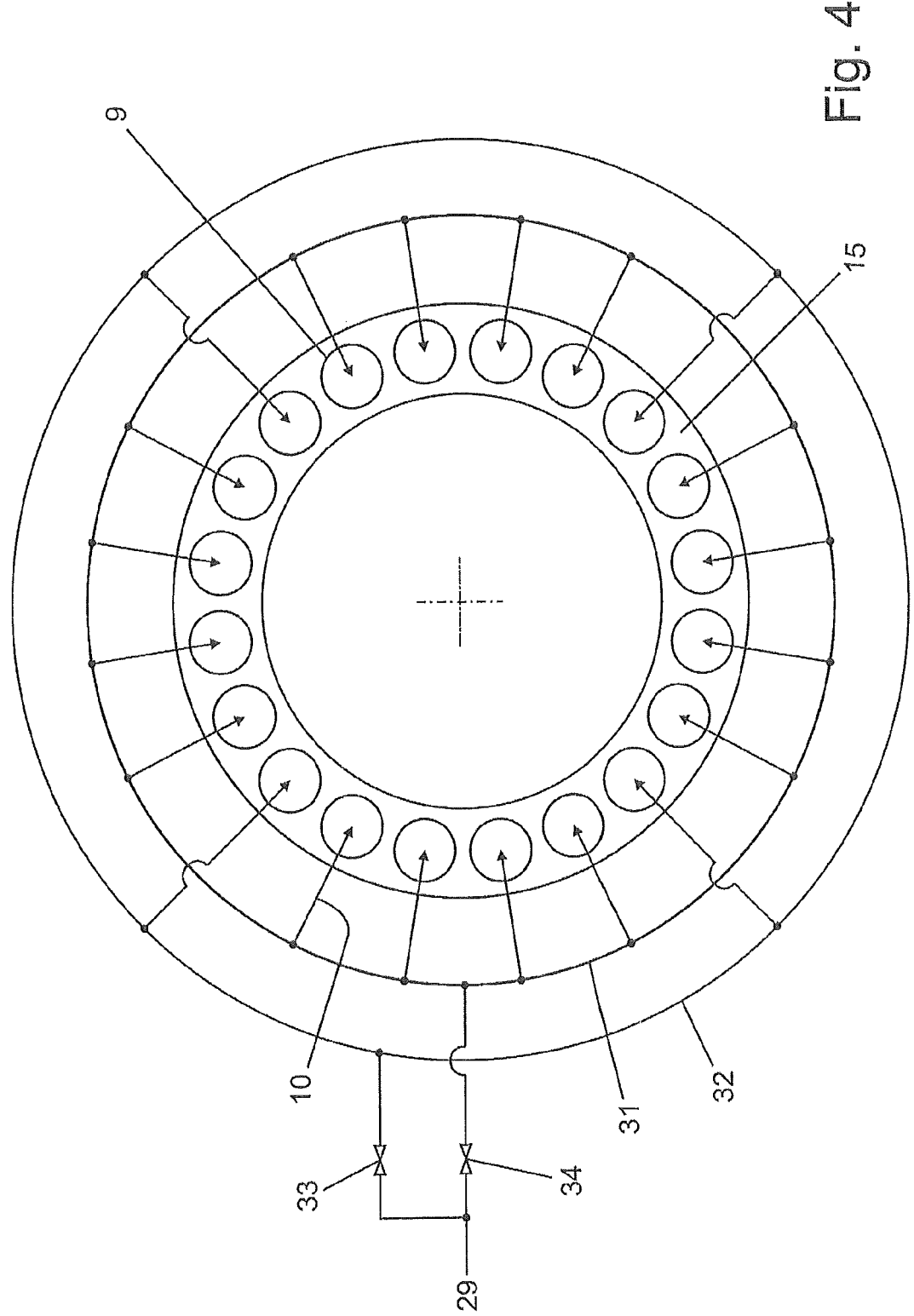
FIG. 4 shows a section through the second combustor of a gas turbine with sequential combustion and also the fuel distribution system with two separately controllable subgroups and two fuel ring mains.

FIG. 4 shows a section through the second combustor 15 of a gas turbine with sequential combustion, and also the fuel distribution system with two separately controllable sub-groups of burners. These have in each case a fuel ring main for a first sub-group 31 and a fuel ring main for a second sub-group 32 and the associated fuel feeds 10. For the independent control of the fuel quantity of both sub-systems, provision is made for a fuel control valve for the first sub-group 33 and a fuel control valve for the second sub-group 34.

The two control valves for the first and the second sub-groups 33, 34 are controlled at low part load so that the fuel mass flow per burner is the same.

As a result, fuel is introduced evenly into all the burners 9 of the second combustor 15 so that all the burners 9 are operated with the same air ratio λ for minimizing the CO emissions. With increasing relative load, especially if, for example, above 70% relative load increased pulsations occur, the control valve of the first sub-group 33 is not opened as wide as the control valve of the second sub-group 34 in order to realize a staging and therefore to stabilize the combustion.

Alternatively, the control valve of the first sub-group 33 can be connected downstream of the second control valve 34. In this case, similar to the example from FIG. 3, at part load the control valve of the first sub-group 33 is to be completely opened and at high part load is to be restricted in order to then realize a staging. The overall fuel mass flow is then controlled via the control valve 34. In the event that the fuel is a liquid fuel, such as oil, water injection becomes necessary for reducing the NOx emissions, depending upon the type of burner.

This is carried out similarly to the fuel supply, for example, and provision is to be made for corresponding lines and control systems.

In the case of so-called dual-fuel gas turbines, which can be operated both with a liquid fuel, such as oil, and with a combustible gas, such as natural gas, separate fuel distribution systems are to be provided for each fuel.

Figure 5:
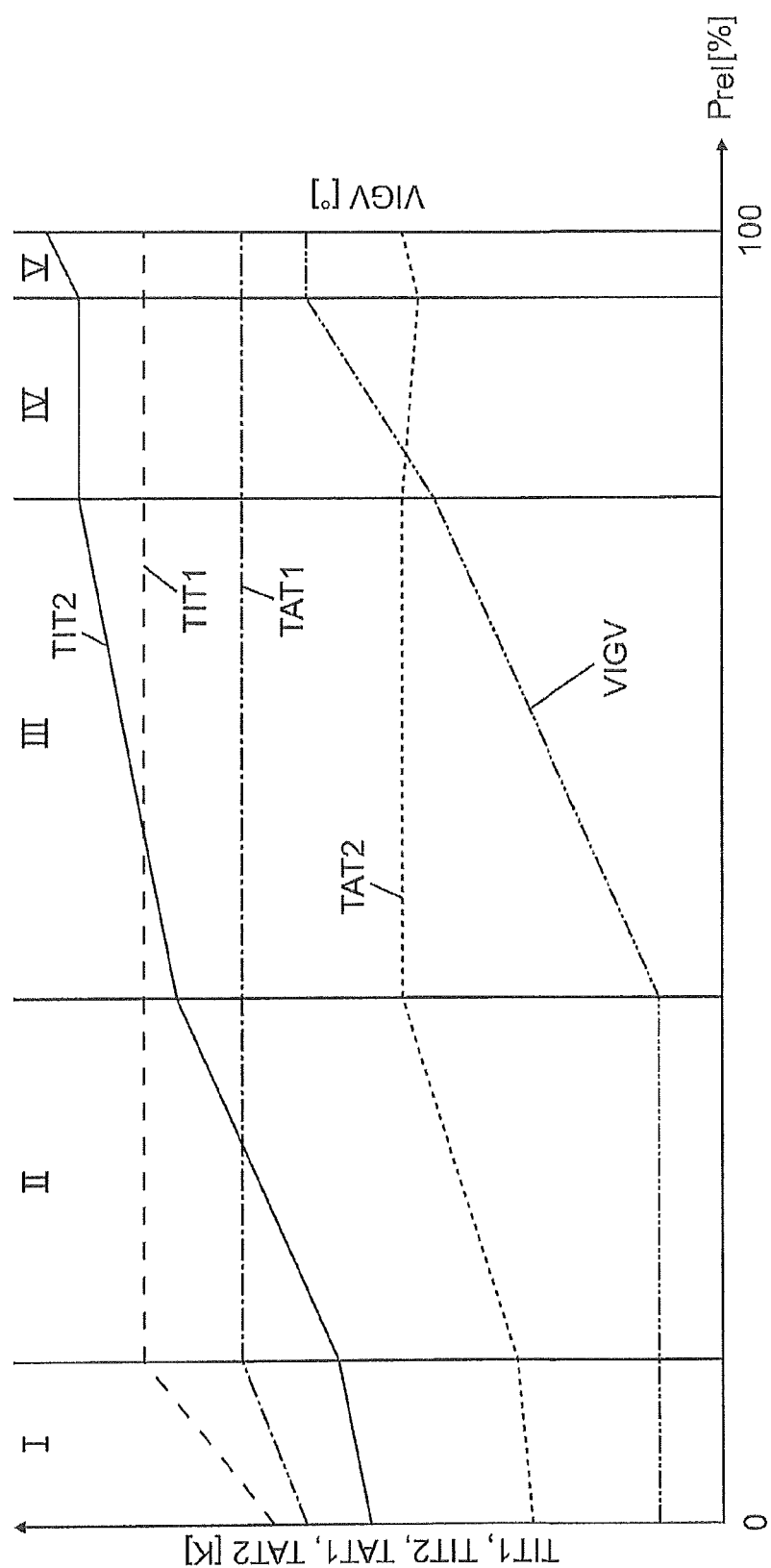
FIG. 5 shows a conventional method for controlling a gas turbine with sequential combustion (prior art)

FIG. 5 shows a conventional method for controlling a gas turbine with sequential combustion with changing loads. Starting from no-load operation, that is to say from a relative load Prel of 0%, the gas turbine is loaded up to full load, that is to say to a relative load Prel of 100%. At 0% Prel, the row of variable compressor inlet guide vanes is closed, that is to say is adjusted to a minimum opening angle.

The first combustor is ignited, which leads to a turbine inlet temperature TIT1 of the first turbine 7 and to a corresponding turbine exhaust temperature TAT1. The second combustor is not yet in operation so that no heating of the gases in the second combustor takes place. The temperature TAT1 of the gases which discharge from the first turbine 7 is reduced to the turbine inlet temperature TIT2 of the second turbine 12 as a result of the combustor cooling and also in consideration of the low-pressure turbine cooling. The expanded gases discharge from the second turbine 12 with a temperature TAT2.

In one phase I of the method, starting from 0% Prel, for power increase the TIT1 is first increased to a TIT1 limit. With increasing TIT1, the exhaust temperature TAT1 and the temperatures TIT2 and TAT2 of the subsequent second turbine 12 also increase.

In order to further increase the power after reaching the TIT1 limit, at the start of phase II the second combustor 15 is ignited and the fuel feed 10 to the burners 9 of the second combustor is increased in proportion to the load. The TIT1 and TAT2 increase over load in phase II correspondingly with a steep gradient until a first limit of the TAT2 is reached. Conventionally, the TAT2 limit is identical to a TAT2 full-load limit.

In order to further increase the power after reaching the TAT2 limit, in a phase III of the method the row of variable compressor inlet guide vanes 14 is opened in order to control the power by increasing the intake mass flow. The pressure ratio of the second turbine 12 increases in proportion to the intake mass flow, which is why at constant TAT2 the TIT2 increases further over the relative load Prel until a first TIT2 limit is reached.

In order to further increase the relative load Prel after reaching the first TIT2 limit, in a phase IV of the method the row of variable compressor inlet guide vanes 14 is opened further at constant TIT2 until it reaches the maximum opened position.

In the example which is shown, in a phase V of the method, with a constant position of the row of variable compressor inlet guide vanes 14, the TIT2 is increased from the first TIT2 limit to a second TIT2 limit until 100% Prel is reached.

Figure 6:
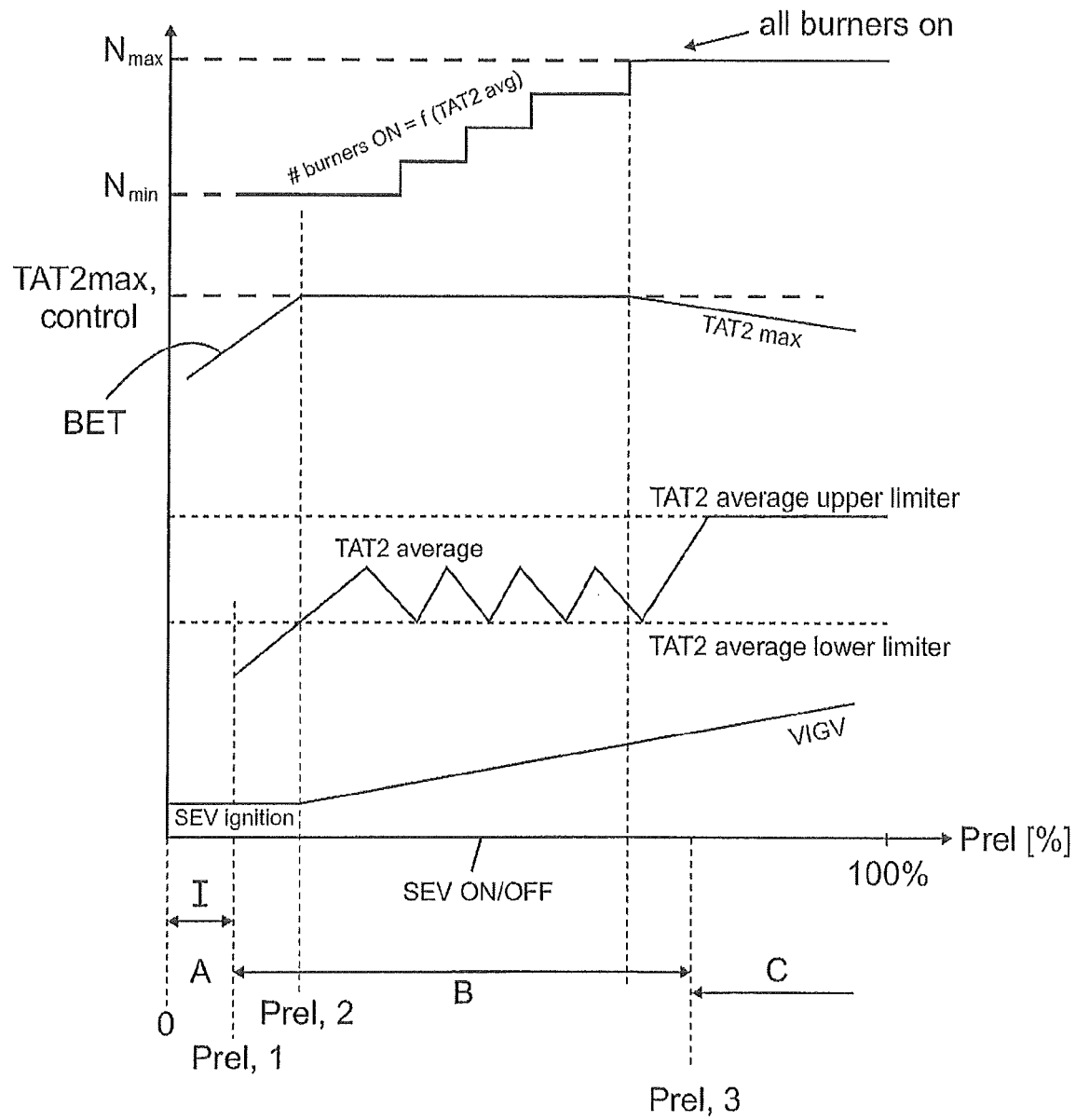
FIG. 6 shows a claimed method for controlling a gas turbine with sequential combustion, in which during loading-up after engaging the second combustor, the local maximum TAT limits are lowered and the TAT average temperature is kept between two lower limit.

FIG. 6 shows a new and inventive method for controlling a gas turbine with sequential combustion and changing loads. Phase A of FIG. 6 is similar to phase I of FIG. 5.

As can be seen in FIG. 6, the burner exhaust temperature BET of the operative burners 9 raises with increasing relative load Prel.

In FIG. 6 only on burner exhaust temperature BET is shown. It is the burner exhaust temperature BET which is the highest among the operative burners 9. As mentioned before the individual burner exhaust temperature BET of each operative burner 9 is monitored by means of an appropriate temperature sensor.

At a load Prel,1 some of the burners 9 of the second combustor 15 are ignited. The number of burners 9 that are ignited is as little as possible. It may be 1 or more burner 9 depending on the gas turbine. Therefore in FIG. 6 at prel,1 the number of burners 9 ignited is referred to as Nmin. The number of burners 9 of the second combustor 15 is equal to Nmax.

The claimed method is executed in phase B, which may cover a load range from 20% to 70%. Phase B is also referred to as "second combustor's burner grouping range".

With further increasing load Prel more fuel is delivered and the opening VIGV of the row of variable compressor inlet guide vanes 14 remains constant. As a result the burner exhaust temperature BET raises.

At the relative load Prel,2 the burner exhaust temperature BET of one of the operative burners 9 reaches the maximum admissible temperature TAT2 maxcontrol.

To avoid overheating of this particular burner 9 the opening VIGV of the row of variable compressor inlet guide vanes 14 is increased. This results in an enlarged air flow through the turbine and consequently the burner exhaust temperature BET remains constant at the maximum admissible temperature TAT2, max, control.

This means that in the load range between prel,1 and prel,2 the CO emissions of the turbine remain at a very low level, too.

Figure 7:
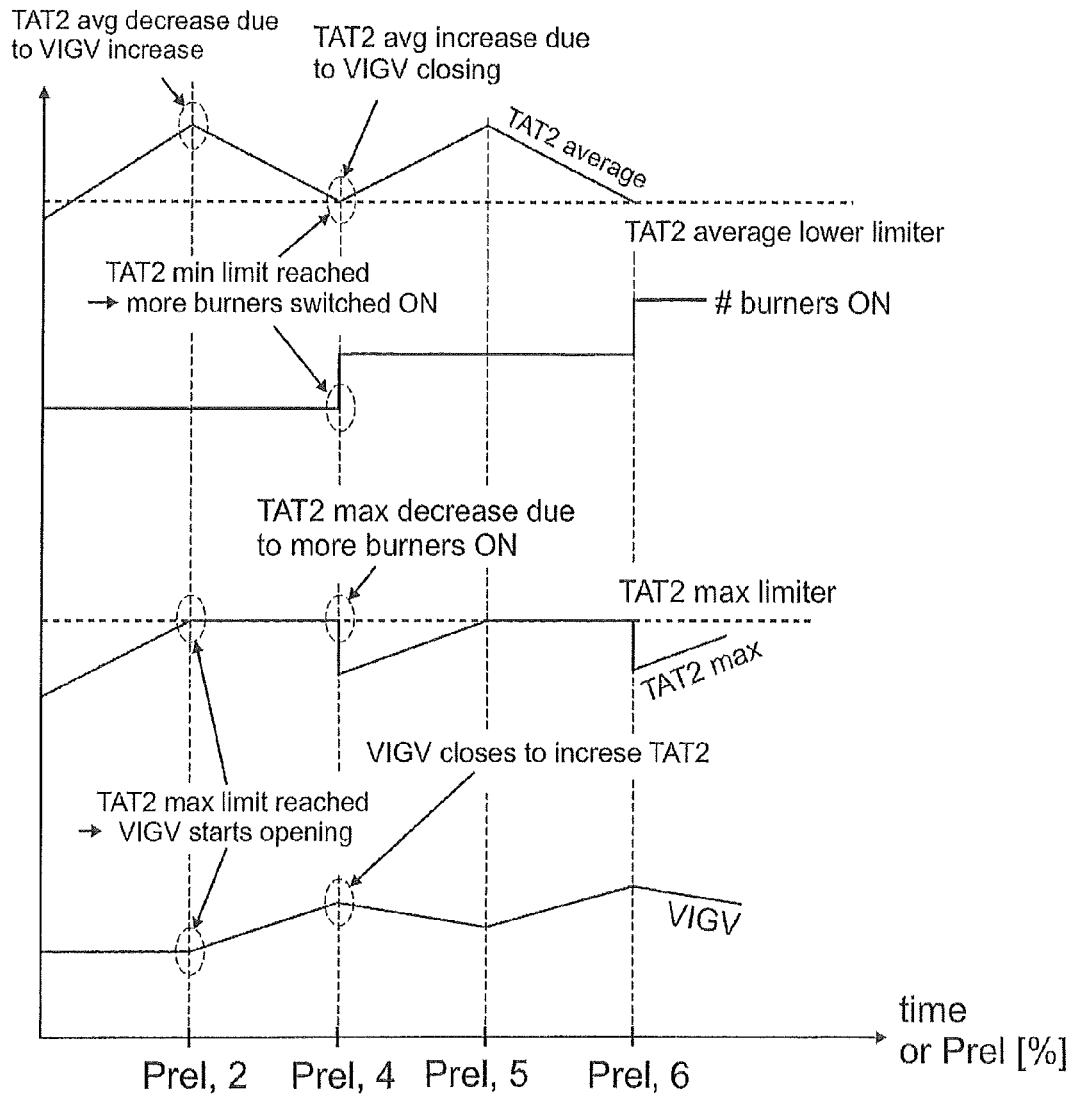
FIG. 7 shows the transient state during the claimed burner switching, e.g. during the loading procedure (when burners are switched "ON").

FIG. 6 is a more general illustration of the claimed method, whereas FIG. 7 shows the claimed method in, more detail during a typical loading procedure.

As can be seen from FIG. 6 in phase B with increasing load the number of operative burners 9 increases step by step until all burners 9 at a load prel,3 are switched "ON" and the number of operative burners 9 is equal to Nmax.

Generally spoken, in the load range between prel,2 and prel,3 the opening of the row of variable compressor inlet guide vanes 14 increases (c. f. line VIGV) and the burner exhaust temperature BET is at or at least near the maximum admissible temperature TAT2, max control. Consequently, the CO emissions of the turbine remain at a very low level also in the load range.

Further it can be seen that the average exhaust temperature of the second turbine TAT2 average is saw-toothed and does not get lower than a TAT2 average, lower limit.

At loads greater than prel,3 it can be seen from FIG. 6 the average exhaust temperature of the second turbine TAT2 average is no more saw-toothed and finally reaches a TAT2 average, upper limit.

With regard to the burner exhaust temperature BET it can be seen that it decreases at loads above prel,3 until full load.

Looking now to FIG. 7 the claimed method is explained in more detail when increasing the load.

FIG. 7 shows the behavior of a gas turbine over time that is operated in accordance with the claimed method.

Starting at a load prel,2 and increasing the load it can be seen from FIG. 7 that the burner exhaust temperature BET of one of the operative burners 9 reaches the maximum admissible temperature TAT2 maxcontrol at prel,2 (as illustrated in FIG. 6, too).

In a load range between prel,2 and prel,4 the opening VIGV of the row of variable compressor inlet guide vanes 14 has a varying slope with a tendency to increasing opening. The slope of VIGV limits the burner exhaust temperature BET to the TAT2 maxlimit. As a result the average temperature TAT2 average decreases in this load range.

At prel,4 the average temperature TAT2 average is equal to the TAT2 lowerlimit. To avoid a reduced efficiency in case of further increasing load, the average temperature TAT2 average has to be raised by igniting a further burner 9.

Doing so, the burner exhaust temperature BET of the operative burners 9 is reduced significantly (c. f. FIG. 7), because the fuel is distributed to more burners 9.

Consequently the VIGV may be closed slightly in the load range between prel,4 and prel,5. This leads to a rather high slope of both the burner exhaust temperature BET of the operative burners 9 and the average temperature TAT2 average.

At the load prel,5 the average temperature TAT2 average again is equal to the TAT2 lowerlimit. To avoid a further increase of this temperature, the opening VIGV of the row of variable compressor inlet guide vanes 14 again has a slope greater zero. The slope of the opening VIGV in the load range between prel,5 and prel,6 is equal or at least rather similar to the slope in the load range between prel,2 and prel,3.

Again this leads to a constant burner exhaust temperature BET equal to the TAT2 maxlimit. As a result the average temperature TAT2 average decreases in this load range, too.

At the load prel,6 the average temperature TAT2 average is equal to the TAT2 lowerlimit. To avoid a reduced efficiency in case of further increasing load, the average temperature TAT2 average has to be raised by igniting a further burner.

In the load range starting from prel,6 and ending at prel,7 (not shown) the control is similar to the control in the load range between prel,4 and prel,5.

This process continues until all burners 9 are ignited at prel,3 (c. f. FIG. 6)

In case the load is reduced from, for example full load to partial load, the method can be reversed.

The claimed method allows to run the turbine at high efficiency and simultaneously with low emissions, especially the CO emissions, at partial load. It is easy to execute and stable and does not cause problems.

The invention claimed is:

1. A method for low-CO emissions operation of a gas turbine with sequential combustion, wherein the gas turbine includes a first turbine, a second turbine, at least one compressor wherein the at least one compressor includes a row of variable compressor inlet guide vanes, a first combustor which is connected downstream to the compressor and the hot gases of which are admitted to the first turbine, and a second combustor which is connected downstream to the first turbine and the hot gases of which are admitted to the second turbine, the second combustor including operative burners each having a burner exhaust temperature, the method comprising:

controlling a position of the variable compressor inlet guide vanes depending on a burner exhaust temperature of at least one the operative burners of the second combustor;

in case of increasing loads, switching "ON" a further operative burner of the second combustor in case an average of the turbine exhaust temperature of the second turbine reaches a lower limit value;

in case of decreasing loads switching "OFF" one of the operative burners of the second combustor in case the average of the turbine exhaust temperature of the second turbine reaches the lower limit value; and at least one of:

controlling the position of the variable compressor inlet guide vanes depending on a difference between the highest burner exhaust temperature of the operative burners and a maximum turbine exhaust temperature;

opening the variable compressor inlet guide vanes when the burner exhaust temperature of one of the operative burners reaches or exceeds the maximum turbine exhaust temperature; and closing the variable compressor inlet guide vanes when the highest burner exhaust temperature of the operative burners is below the maximum turbine exhaust temperature.

2. The method as claimed in claim 1, wherein the opening of the variable compressor inlet guide vanes when the burner exhaust temperature of one of the operative burners reaches or exceeds a maximum turbine exhaust temperature is performed.

3. The method as claimed in claim 2, wherein the position of the variable compressor inlet guide vanes is controlled depending on the maximum turbine exhaust temperature of the operative burners of the second combustor.

4. The method as claimed in claim 1, wherein the closing of the variable compressor inlet guide vanes when the highest burner exhaust temperature of the operative burners is below a maximum turbine exhaust temperature is performed.

5. The method as claimed in claim 4, wherein the position of the variable compressor inlet guide vanes is controlled depending on the maximum turbine exhaust temperature of the operative burners of the second combustor.

6. The method of claim 1, comprising:

increasing a rate of fuel supplied to the second combustor and/or the first combustor with a load increase.

7. The method as claimed in claim 1, comprising:

decreasing a rate of fuel supplied to the second combustor and/or the first combustor with a load decrease.

8. The method as claimed in claim 1, wherein both of the opening of the variable compressor inlet guide vanes when the burner exhaust temperature of one of the operative burners reaches or exceeds a maximum turbine exhaust temperature and the closing of the variable compressor inlet guide vanes when the highest burner exhaust temperature of the operative burners is below the maximum turbine exhaust temperature are performed.

9. The method as claimed in claim 1, wherein the controlling of the position of the variable compressor inlet guide vanes depending on a difference between the highest burner exhaust temperature of the operative burners and the maximum turbine exhaust temperature is performed.

10. The method as claimed in claim 1, wherein a control unit of the gas turbine performs the switching "ON" and performs the switching "OFF".

11. The method as claimed in claim 1, wherein the gas turbine comprises at least one fuel line leading to the operative burners.

12. A method for low-CO emissions operation of a gas turbine with sequential combustion, wherein the gas turbine includes a first turbine, a second turbine, at least one compressor wherein the at least one compressor includes a row of variable compressor inlet guide vanes, a first combustor which is connected downstream to the compressor and the hot gases of which are admitted to the first turbine, and a second combustor which is connected downstream to the first turbine and the hot gases of which are admitted to the second turbine, the second combustor including operative burners each having a burner exhaust temperature, the method comprising:

controlling a position of the variable compressor inlet guide vanes depending on a burner exhaust temperature of at least one the operative burners of the second combustor;

in case of increasing loads, switching "ON" a further operative burner of the second combustor in case an average of the turbine exhaust temperature of the second turbine reaches a lower limit value;

in case of decreasing loads switching "OFF" one of the operative burners of the second combustor in case the average of the turbine exhaust temperature of the second turbine reaches the lower limit value; and wherein in case all operative burners of the second combustor are in operation, controlling the position of the variable compressor inlet guide vanes depending on the average temperature of the turbine exhaust temperature.

13. The method as claimed claim 12, wherein the position of the variable compressor inlet guide vanes is controlled so that the average temperature of the turbine exhaust temperature is equal to an upper limit of the average turbine exhaust temperature.

14. The method as claimed in claim 12, further comprising:

increasing a rate of fuel supplied to the second combustor and/or the first combustor with a load increase.

15. The method as claimed in claim 12, further comprising:

decreasing a rate of fuel supplied to the second combustor and/or the first combustor with a load decrease.

16. A gas turbine comprising:

a compressor with variable inlet guide vanes;

a first turbine;

a second turbine;

a first combustor connected downstream to the compressor such that during operation hot gases from the first combustor are admitted to the first turbine; and a second combustor connected downstream to the first turbine such that hot gases from the second combustor are admitted to the second turbine wherein the second combustor comprises a plurality of operative burners;

at least one fuel line leading to the plurality of operative burners of the second combustor; and an individual on/off valve or an individual control valve arranged in at least one fuel line to control individual operative burners and a control unit, the control unit executing the method of claim 12.

17. The method as recited in claim 12, comprising at least one of:
opening the variable compressor inlet guide vanes when the burner exhaust temperature of one of the operative burners reaches or exceeds a maximum turbine exhaust temperature; and
closing the variable compressor inlet guide vanes when the highest burner exhaust temperature of the operative burners is below the maximum turbine exhaust temperature.

18. The method as recited in claim 12, comprising both of:
opening the variable compressor inlet guide vanes when the burner exhaust temperature of one of the operative burners reaches or exceeds a maximum turbine exhaust temperature; and
closing the variable compressor inlet guide vanes when the highest burner exhaust temperature of the operative burners is below the maximum turbine exhaust temperature.

19. A method for low-CO emissions operation of a gas turbine with sequential combustion, wherein the gas turbine includes a first turbine, a second turbine, at least one compressor wherein the at least one compressor includes a row of variable compressor inlet guide vanes, a first combustor which is connected downstream to the compressor and the hot gases of which are admitted to the first turbine, and a second combustor which is connected downstream to the first turbine and the hot gases of which are admitted to the second turbine, the second combustor including operative burners each having a burner exhaust temperature, the method comprising:
controlling a position of the variable compressor inlet guide vanes depending on a burner exhaust temperature of at least one the operative burners of the second combustor;
in case of increasing loads, switching "ON" a further operative burner of the second combustor in case an average of the turbine exhaust temperature of the second turbine reaches a lower limit value;
in case of decreasing loads switching "OFF" one of the operative burners of the second combustor in case the average of the turbine exhaust temperature of the second turbine reaches the lower limit value; and
wherein an upper limit value of the average turbine exhaust temperature is greater than the lower limit value.

20. The method as claimed in claim 19, wherein the position of the variable compressor inlet guide vanes is controlled depending on the maximum turbine exhaust temperature of the operative burners of the second combustor.

* * * * *